Aug. 4, 1970     H. J. A. NIJHUIS     3,522,940

SPRING ELEMENT

Filed Jan. 16, 1968     2 Sheets-Sheet 1

3,522,940
SPRING ELEMENT
Hendrik J. A. Nijhuis, Aalst, Netherlands, assignor to
Tijer Plastics, N.V., a Dutch corporation
Filed Jan. 16, 1968, Ser. No. 698,266
Claims priority, application Netherlands, Jan. 17, 1967,
6700690
Int. Cl. B60q 11/58
U.S. Cl. 267—34                                                                   6 Claims

ABSTRACT OF THE DISCLOSURE

A spring element for use, for example, as a vehicle shock absorber incorporates a hollow gas tight body of extensible flexible material filled with gas at a pressure at least as great as atmospheric pressure and helical spring means disposed about the hollow body and in snug engagement therewith to serve as reinforcement therefor. If desired, dished auxiliary elements may be mounted at the extremities of the spring element so as to form interconnections with different parts of the hollow body and the spring element.

---

The invention relates to a spring element intended to be arranged between the spring-controlled and the non-spring controlled parts of a vehicle in order to obtain a shock-absorbing effect, said element comprising one or more hollow bodies in the form of a sphere or an ellipsoid, the wall being made of a flexible, extensible material, the element being filled with a gas, preferably, air at atmospheric or superatmospheric pressure, which element may, if necessary, comprise one or more auxiliary pieces. Such a spring element is known from Belgian patent specification 336,627. The shock-absorbing effect of the elements described therein appears to be small in practice, particularly because the wall of the hollow body is made of rubber.

The invention is based on the recognition of the fact that the unsatisfying effect of the known spring element has to be attributed to the fact that the wall of the hollow body, in which the air contained therein is compressed by a shock, is subject to very rapid expansion, so that the counter-pressure exerted by the compressed air disappears substantially immediately. Consequently, a "breakdown" of the springs in the event of great unevennesses of the road cannot be prevented by the spring element. After the termination of the force exerted by the shock the hollow body resumes its initial shape practically immediately so that the shock is reflected substantially with non-reduced intensity.

The invention has for its object to obviate the disadvantages of the known spring element and to cause the spring element to have a vigorous shock-absorbing effect and is characterized in that one or more hollow bodies of the kind set forth is (are) arranged inside a helical spring and in that under the action of mechanical forces the great extension and shrinkage-inertia of the material of the hollow body can be utilized for the shock-absorbing effect. Preferably more than one spherical hollow body will be employed for the following reasons.

The spherical shape provides the maximum shock-absorbing effect owing to the maximum wall surface per unit of volume. A plurality of superimposed spherical bodies provides a better shock-absorbing effect than, for example, one cylindrical body of the same material; by a difference in superatmospheric pressure, when a plurality of spheres or only one is used at will, the shock-absorbing effect of the material of one or of more of the spheres can be utilized or this shock-absorbing effect may be employed in conjunction with the increased rigidity of the spring portions which are partly surrounded by the material of the spheres.

A very effective material which exhibits said property of a considerably greater extension and shrinkage-inertia than rubber, is plasticized polyvinylchloride. When the hollow body is made of such a material, the wall will expand only very gradually when the air is compressed by a shock, so that the counter-pressure of the compressed air decreases only slowly. After the force exerted by the shock has disappeared, the body resumes its initial shape quite gradually so that the counter-shock is strongly reduced. The extension and shrinkage-inertia of the material thus produces an attenuated spring effect so that shocks are effectively absorbed. The outer diameter of the hollow body may be 90 mms. at atmospheric pressure and, for example, 5 mms. smaller than the diameter of the cylinder formed by the internal space of the helical spring. In this manner the hollow bodies will, in practice, be positioned by the helical spring so that they are located one above the other without the need for using any fastening member.

In order to materially increase the effect, the hollow bodies have to be arranged inside a helical spring with such accurate fit that parts of the helical spring are already partly surrounded by the wall of the hollow body. In the event of a shock the aforesaid phenomenon will then occur not only on account of the great extension and shrinkage-inertia, but also with respect to the spring and said material, simultaneously with the counter-action of the stiffened spring owing to the contact of the material of the hollow body between two consecutive parts of the helical spring. In this manner the counter-shock is strongly reduced, so that shocks can be absorbed still more effectively than by means of the shock-absorbing effect of the body alone. Such a combined shock-absorbing effect, that is to say, the combination of the great extension-shrinkage inertia and the stiffening of the spring may alternately also be obtained by arranging a plurality of smaller, hollow bodies, preferably spheres, inside he helical spring. Of course, the outer diameters have to be such that, even in the unloaded state of the spring such spheres cannot get out of the helical spring.

When two or more spherical bodies are used in one helical spring, the shock-absorbing effect can be increased in accordance with the load of the vehicle. For this purpose the pressure of the gas in the hollow body may be different in each body in the no-load state of the vehicle, so that the shock-absorbing effect of a spring element according to the invention becomes optimum as soon as the pressures of the gas in the hollow bodies are equal under the action of the increase in load and a maximum "contact" between the material of the spheres and the spring is attained.

The hollow body of the spring element according to the invention is provided in known manner with a valve by means of which the pressure of the gas in the hollow body can be adjusted to a desired value. The valve has to be constructed so that, when the air is expelled and the hollow body is pressed to flatness, the hollow body maintains the flat shape, so that these hollow bodies can be readily accommodated in existing helical springs.

In order to avoid damage and to enable a general use of the hollow bodies required for the spring element, dished protective supporting plates have to be employed, if necessary, with a view to the fastening means of helical springs used in practice on vehicles, the dished, protective supporting plate has to be provided with a cavity for receiving a shock cap, nut or the like, if any. The dished, protective supporting plate is preferably provided with a sloping rim.

The invention will be described more fully with reference to the following drawings, which show a few embodiments:

In all these figures reference number 1 designates the helical spring; 2 the hollow body provided with a valve 3; 4 designates the dished auxiliary piece serving as a protective supporting plate, provided with a recess 5, which is adapted to receive, for example, the rubber shock cap 6 and, for example, a nut or the like.

Figure 1:
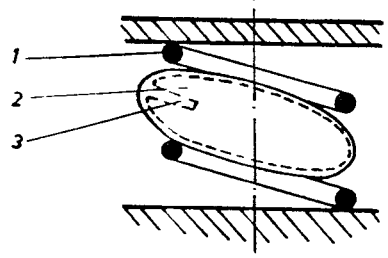
FIG. 1 shows a flattened, hollow body, which is inserted across the turns into the helical spring. The hollow bodies are preferably arranged inside the helical spring in the unloaded state.
Figure 2:
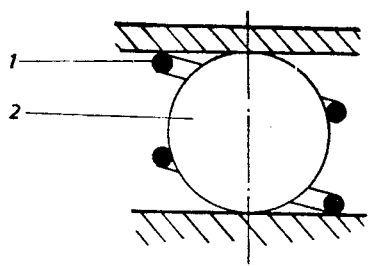
FIG. 2 shows the hollow body before the normal load is applied to the helical spring, whilst, if necessary, the pressure inside the hollow body is increased.
Figure 3:
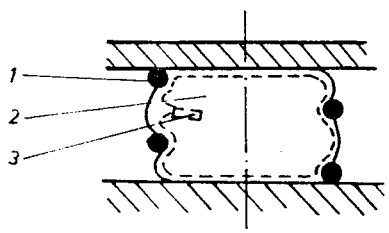
FIG. 3 shows the state in which the spring is loaded normally and the pressure in the hollow body is at the desired value.
Figure 4:
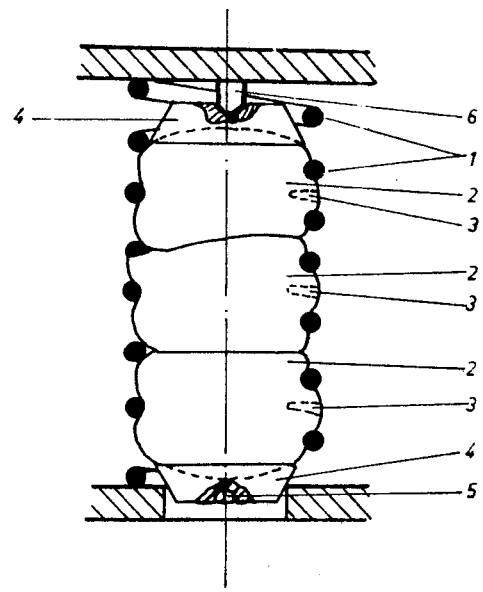
FIG. 4 shows a spring element according to the invention, in which three hollow bodies in conjunction with two dished protective, supporting plates are employed.
Figure 5:
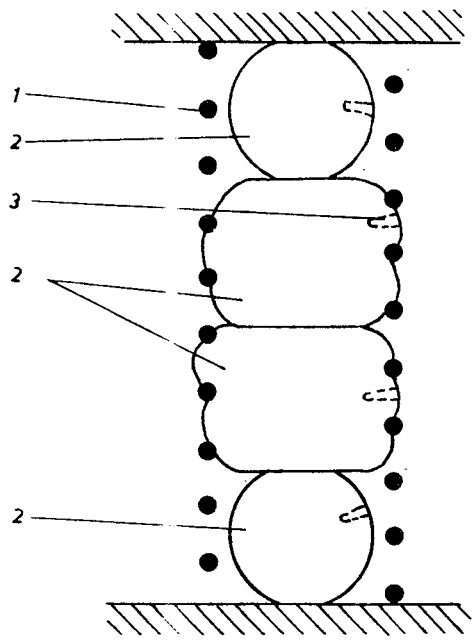

FIG. 5 shows a spring element according to the invention in which four hollow bodies are employed; the upper and the lower hollow bodies have a lower superatmospheric pressure than the two hollow bodies at the center.

It is advisable to choose the wall thickness and the outer diameter of the hollow body so that it may be employed with all helical springs found in practice on vehicles.

Figure 6:
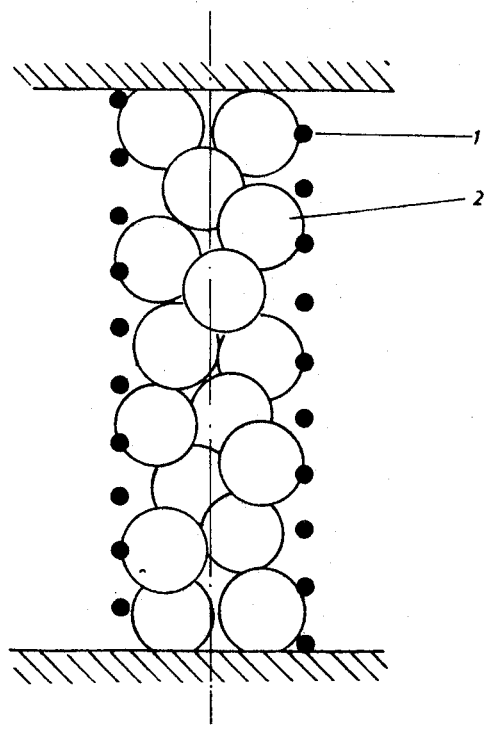

FIG. 6 shows a further embodiment in which hollow bodies, preferably spherical bodies with comparatively small diameters are used, so that these spheres are not located above the other. Also in this embodiment the great extension-shrinkage inertia of the material of the spheres and the increases in rigidity of the helical spring due to the contact with the material of the spheres on and partly around the helical spring are utilized. With this embodiment also the advantages of a rapid assembly, the uniformity of the spheres and hence the lower costs of manufacture of the spheres are completely maintained. Moreover, also in this embodiment spheres may be mounted which have different superatmospheric pressures of the gas inside the spheres.

An important advantage of the spring element according to the invention, in practice, is that in contrast, for example, to the spring element described in Belgian patent specification 336,627 the hollow bodies consisting, for example, of plasticized polyvinylchloride need not be pumped up in the event of heavier load, which means that the superatmospheric pressure need not be varied, for example, even when under full-load conditions of the vehicle a charged caravan is attached thereto. Conversely, upon a decrease in load aeration need not be carried out. This is based on the property of the extension-shrinkage inertia of the material concerned and also on the small volume of the cavity in the hollow body.

I claim:
1. A spring element comprising a single helical spring, a hollow body of plasticized polyvinyl-chloride having great extension and shrinkage inertia, and gas in said hollow body at a pressure at least as great as atmospheric pressure, the helical spring being disposed about said hollow body and in snug engagement therewith under normal and abnormal load conditions for supplementing and reinforcing the shock absorbing action of said hollow body.

2. A spring element comprising a single helical spring and a number of hollow bodies of extensible flexible plasticized polyvinylchloride having great extension and shrinkage inertia, gas in said hollow bodies at a pressure at least as great as atmospheric pressure, the helical spring being disposed about said hollow bodies and in snug engagement therewith for supplementing and reinforcing the simultaneous shock absorbing action of said hollow bodies and the minimum transverse dimension of each of said hollow bodies being greater than the axial spacing between adjacent convolutions of said spring.

3. A spring element as claimed in claim 2, wherein at least two hollow bodies are disposed within said helical spring and wherein the pressures in said hollow bodies are different during inactive conditions of the spring element.

4. A spring element as claimed in claim 2, wherein the outer diameter of at least one hollow body is smaller than the inner diameter of the helical spring.

5. A spring element according to claim 2 wherein at least one of said bodies is spherical.

6. A spring element according to claim 2 where at least one of said bodies is ellipsoidal.

References Cited

UNITED STATES PATENTS

| | | | |
|---|---|---|---|
| 1,703,222 | 2/1929 | Brimm | 267—34 XR |
| 2,969,974 | 1/1961 | Pemberton | 267—34 |

JAMES B. MARBERT, Primary Examiner

U.S. Cl. X.R.

263—1